United States Patent
Sen et al.

(10) Patent No.: US 9,014,092 B2
(45) Date of Patent: Apr. 21, 2015

(54) EXTENSION OF LOCATION STATUS EVENT

(71) Applicant: Apple Inc., Cupertino, CA (US)

(72) Inventors: Abhishek Sen, San Jose, CA (US); Qin Zhang, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 158 days.

(21) Appl. No.: 13/631,733

(22) Filed: Sep. 28, 2012

(65) Prior Publication Data

US 2013/0286936 A1    Oct. 31, 2013

Related U.S. Application Data

(60) Provisional application No. 61/640,581, filed on Apr. 30, 2012.

(51) Int. Cl.
| | |
|---|---|
| H04W 4/00 | (2009.01) |
| H04W 60/00 | (2009.01) |
| H04W 92/08 | (2009.01) |
| H04L 29/06 | (2006.01) |

(52) U.S. Cl.
CPC .............. *H04W 60/00* (2013.01); *H04W 92/08* (2013.01); *H04W 4/003* (2013.01); *H04L 65/1073* (2013.01)

(58) Field of Classification Search
None
See application file for complete search history.

(56) References Cited

U.S. PATENT DOCUMENTS

| | | | |
|---|---|---|---|
| 7,054,613 B2 | 5/2006 | Smeets | |
| 7,174,160 B2 | 2/2007 | Takae et al. | |
| 7,627,345 B2 | 12/2009 | Neuhaus et al. | |
| 7,845,568 B2 | 12/2010 | Parlange et al. | |
| 2006/0291483 A1 | 12/2006 | Sela | |
| 2007/0238468 A1* | 10/2007 | Buckley et al. | 455/445 |
| 2010/0118861 A1* | 5/2010 | Witzel et al. | 370/352 |
| 2011/0299429 A1* | 12/2011 | Tiwari | 370/259 |
| 2012/0275321 A1* | 11/2012 | Ruvalcaba et al. | 370/252 |
| 2013/0237197 A1* | 9/2013 | Ruvalcaba et al. | 455/418 |
| 2013/0295997 A1* | 11/2013 | Sen et al. | 455/558 |
| 2014/0010148 A1* | 1/2014 | Ali et al. | 370/328 |

OTHER PUBLICATIONS

High Speed HSPA-H3 AT Commands Reference Guide, 2011, Multi-Tech System, S000505B, Rev B.*

* cited by examiner

*Primary Examiner* — Michael Thier
*Assistant Examiner* — Yaotang Wang
(74) *Attorney, Agent, or Firm* — Womble Carlyle Sandridge & Rice, LLP

(57) ABSTRACT

A processor in a mobile wireless device communicates detailed state information about attachments to a user identity module card embedded in the mobile wireless device. The processor detects a change in an attach state of the mobile wireless device for at least one of a plurality of attachment types. The processor determines the attach state of the mobile wireless device for each of the plurality of attachment types and sends a status message to the user identity module card indicating the determined attach states. The plurality of attachment types can include at least a circuit switched attachment and a packet switched attachment. The processor can wait until completion of circuit switched and packet switched attachments of the mobile wireless device to the wireless network prior to sending the status message.

19 Claims, 13 Drawing Sheets

1200

| Byte(s) | Description | Length |
|---|---|---|
| 1 | Location Status Tag | 1 |
| 2 | Length (X) of Bytes Following | 1 |
| 3 | Location Status | 1 |

(Prior Art)

1210

| Byte(s) | Description | Length |
|---|---|---|
| 1 | Location Status Tag | 1 |
| 2 | Length (X) of Bytes Following | 3 |
| 3 | CS Location Status | 1 |
| 4 | PS Location Status | 1 |
| 5 | IMS Location Status | 1 |

EXTENSION OF LOCATION STATUS EVENT

CROSS REFERENCE TO RELATED APPLICATIONS

This application claims the benefit of U.S. Provisional Patent Application No. 61/640,581, filed on Apr. 30, 2012, and entitled "EXTENSION OF LOCATION STATUS EVENT," which is hereby incorporated by reference herein in its entirety and for all purposes.

TECHNICAL FIELD

The described embodiments generally relate to methods and apparatuses for communication of status information between a mobile wireless device and an embedded user identity module card. More particularly, the present embodiments describe providing location status update information between a mobile wireless device and a user identity module card including specific status for multiple attachment types of the mobile wireless device to one or more wireless networks.

BACKGROUND

Wireless networks and mobile wireless devices continue to evolve as new communication technologies develop and standardize. Current wireless network deployments support both circuit switched (CS) and packet switched (PS) connections as well as burgeoning internet protocol multimedia service (IMS) connections. Representative wireless networks for a wireless network service provider can include support for one or more releases of wireless communication protocols specified by the Third Generation Partnership Project (3GPP) and Third Generation Partnership Project 2 (3GPP2) communication standards organizations. The 3GPP develops mobile communication standards that include releases for Global System for Mobile Communications (GSM), General Packet Radio Service (GPRS), Universal Mobile Telecommunications System (UMTS), Long Term Evolution (LTE) and LTE Advanced standards. The 3GPP2 develops wireless communication standards that include CDMA2000 1xRTT and 1xEV-DO standards. Representative mobile wireless devices can connect to one or more wireless networks using one or more wireless communication protocols, either serially or in some cases in parallel.

Mobile wireless devices can include user identity module (UIM) cards, typically removable and configurable, that can contain subscriber and network information, authentication data and service configurations available to the subscriber. Mobile wireless devices that connect to "cellular" wireless networks can offer a variety of different connection types, such as circuit switched (CS) voice connections and packet switched (PS) data connections.

SUMMARY OF THE DESCRIBED EMBODIMENTS

In one embodiment, a method to communicate state information between a mobile wireless device and a user identity module card is described. The method includes at least the following steps. In a first step, the mobile wireless device detects a change in an attach state of the mobile wireless device to a wireless network for at least one of a plurality of attachment types. Subsequently, the mobile wireless device determines the attach state of the mobile wireless device to the wireless network for each of the plurality of attachment types. The mobile wireless device sends a status message to the user identity module card in the mobile wireless device indicating the determined attach state of the mobile wireless device to the wireless network for each of the plurality of attachment types. The plurality of attachment types include at least a circuit switched (CS) attachment and a packet switched (PS) attachment.

In another embodiment, a mobile wireless device including a user identity module card and a configurable processor is described. The processor is configured to detect a change in an attach state of the mobile wireless device to a wireless network for at least one of a plurality of attachment types. The processor is also configured to determine the attach state of the mobile wireless device to the wireless network for each of the plurality of attachment types. The processor is further configured to wait at least until completion of circuit switched (CS) and packet switched (PS) attachments of the mobile wireless device to the wireless network, and to send, subsequent to completion of the CS and PS attachments, a status message to the user identity module card in the mobile wireless device indicating the mobile wireless device is in service. The location status message may indicate the determined attach state of the mobile wireless device to the wireless network for each of the plurality of attachment types, and the plurality of attachment types may include at least a circuit switched (CS) attachment and a packet switched (PS) attachment.

In a further embodiment, a non-transitory computer readable medium for a computer system is described. The non-transitory computer readable medium is for communicating state information between a mobile wireless device and a user identity module card and has stored thereon computer program code executable by a processor The computer program code includes the following computer program code. Computer program code that causes the processor to detect a change in an attach state of the mobile wireless device to a wireless network for at least one of a plurality of attachment types. Computer program code that causes the processor to determine the attach state of the mobile wireless device to the wireless network for each of the plurality of attachment types. Computer program code that causes the processor to send a status message to the user identity module card in the mobile wireless device indicating the determined attach state of the mobile wireless device to the wireless network for each of the plurality of attachment types. The plurality of attachment types include at least a circuit switched (CS) attachment and a packet switched (PS) attachment.

The embodiments disclosed herein can apply equally to mobile wireless devices that connect with GSM networks, UMTS networks, CDMA2000 networks, LTE networks and LTE-Advanced networks and also to mobile wireless devices that can connect in parallel to combinations of wireless networks.

BRIEF DESCRIPTION OF THE DRAWINGS

The described embodiments and the advantages thereof may best be understood by reference to the following description taken in conjunction with the accompanying drawings.

DETAILED DESCRIPTION OF SELECTED EMBODIMENTS

Figure 1:
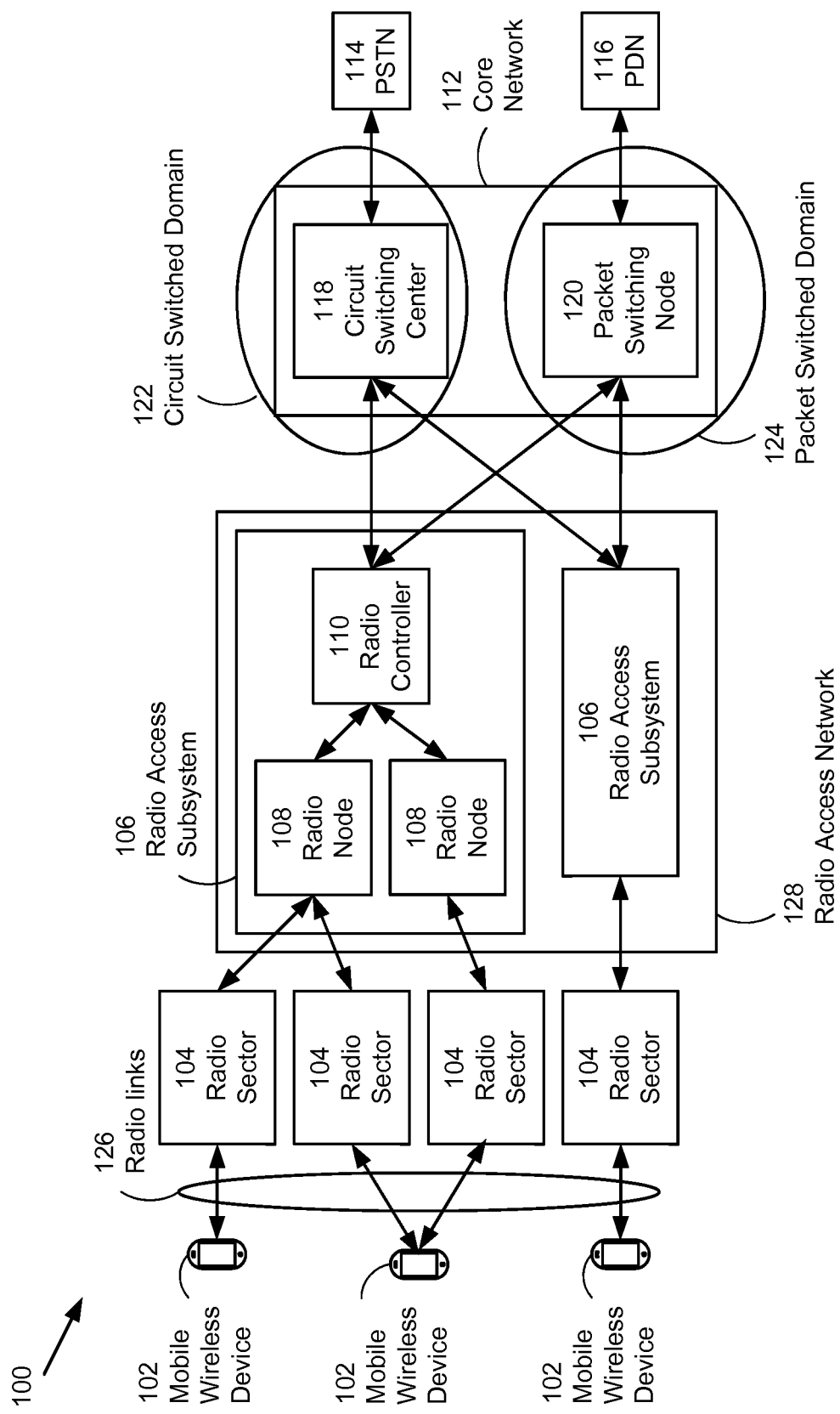
FIG. 1 illustrates components of a generic wireless network.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

The examples and embodiments provided below describe various methods and apparatuses to communicate status information between a processor in a mobile wireless device and a user identity module (UIM) card embedded in the mobile wireless device. The present embodiments provide information about attachments of the mobile wireless device to one or more wireless networks using location status update messages. The mobile wireless device can be attached to the one or more wireless networks through several different attachment types. Typically a mobile wireless device designed for voice communication and short message service (SMS) communication can use "circuit switched" (CS) connections, while a "smart" mobile wireless device designed for data communication can use "packet switched" (PS) connections. Many mobile wireless devices offer both CS and PS connections, and users of these multi-functional mobile wireless devices often subscribe to separate voice, messaging and data services. Circuit switched networks continue to offer voice and short message services while packet switched networks continue to expand data oriented services to include a multiplicity of services including video and packet voice. Wireless mobile wireless devices also continue to increase in functionality to supplement voice connections with multimedia internet connectivity.

When powering up, waking from a sleep mode or re-establishing one or more connections, the mobile wireless device can "attach" to one or more wireless networks. CS and PS connections can use different mechanisms to "attach" the mobile wireless device to a wireless network, and attachments for different types of connections can occur at different times. Waiting until all possible connections are established can delay availability of services that attach earlier, and can thereby impact a user's perception of responsiveness of the mobile wireless device and/or the wireless network service provider. Indicating that a mobile wireless device is "in service" to an embedded UIM card without providing any specificity of attachment types can result in attempts to use services that are not available. Current wireless communication standards provide for communication between a processor in a mobile wireless device and a UIM card embedded in the mobile wireless device. The mobile wireless device can indicate to the UIM card that the mobile wireless device is attached to the wireless network using a location status message that includes a field that specifies "service" conditions, e.g. "in service" and "not in service". The location status message, however, is generic and not specific to a type of attachment between the mobile wireless device and the wireless network. As described herein, location status messages are expanded to refer to specific types of attachments between the mobile wireless device and one or more wireless networks. Individual types of attachments, such as an attachment for a CS service, an attachment for a PS service and/or an attachment for an IMS service (e.g. packet voice) can be indicated in the expanded location status messages by the mobile wireless device to the UIM card. With greater detail in the location status messages, the UIM card can determine appropriate commands to send and services to access based on the expanded location status rather than rely only on a generic "in service" indication from the mobile wireless device.

These and other embodiments are discussed below with reference to FIGS. 1-13. However, those skilled in the art will readily appreciate that the detailed description given herein with respect to these figures is for explanatory purposes only and should not be construed as limiting.

FIG. 1 illustrates a representative generic wireless communication network 100 that can include multiple mobile wireless devices 102 connected by radio links 126 to radio sectors 104 provided by a radio access network 128. Each radio sector 104 can represent a geographic area of radio coverage emanating from an associated radio node 108 using a radio frequency carrier at a selected frequency. Radio sectors 104 can have different geometric shapes depending on antenna configuration, such as radiating outward in an approximate circle or hexagon from a centrally placed radio node 108 or cone shaped for a directional antenna from a corner placed radio node 108. Radio sectors 104 can overlap in geographic area coverage so that the mobile wireless device 102 can receive signals from more than one radio sector 104 simultaneously. Each radio node 108 can generate one or more radio sectors 104 to which the mobile wireless device 102 can connect by one or more radio links 126.

In some wireless networks 100, the mobile wireless device 102 can be connected to more than one radio sector 104 simultaneously. The multiple radio sectors 104 to which the mobile wireless device 102 is connected can come from a single radio node 108 or from separate radio nodes 108 that can share a common radio controller 110. A group of radio nodes 108 together with the associated radio controller 110 can be referred to as a radio access subsystem 106. Typically each radio node 108 in a radio access subsystem 106 can include a set of radio frequency transmitting and receiving equipment mounted on an antenna tower, and the radio controller 110 connected to the radio nodes 108 can include electronic equipment for controlling and processing transmitted and received radio frequency signals. The radio controller 110 can manage the establishment, maintenance and release of the radio links 126 that connect the mobile wireless device 102 to the radio access network 128.

The radio access network 128, which provides radio frequency air link connections to the mobile wireless device 102, connects also to a core network 112 that can include a circuit switched domain 122, usually used for voice traffic, and a packet switched domain 124, usually used for data traffic.

Radio controllers 110 in the radio access subsystems 106 of the radio access network 128 can connect to both a circuit switching center 118 in the circuit switched domain 122 and a packet switching node 120 in the packet switched domain of the core network 112. The circuit switching center 118 can route circuit switched traffic, such as a voice call, to a public switched telephone network (PSTN) 114. The packet switching node 120 can route packet switched traffic, such as a "connectionless" set of data packets, to a public data network (PDN) 116.

Before establishing a voice connection or a data connection to the wireless network 100, the mobile wireless device 102 can locate signals transmitted by one or more radio nodes 108, can select a radio sector 104 and can exchange a set of messages with the wireless network 100 to identify itself and attach to (i.e. camp on) the selected radio sector 104. (Radio sectors 104 can also be referred to as "cells" for certain wireless technologies; however, the disclosure herein will use the generic term "radio sector" in place of the term "cell.") An attach procedure for a data connection can be separate from and in addition to an attach procedure used for a voice connection. Thus, the mobile wireless device 102 can be attached to the wireless network 100 for each of several different services individually that can use the circuit switched domain 122 and packet switched domain 120 separately. In order for an embedded UIM card, which can initiate service requests to the mobile wireless device 102, to know a detailed attach state of the mobile wireless device 102 to the wireless network 100, location status messages with specific attach state information can be provided by the mobile wireless device 102 to the UIM card. The attach state information can be provided when the attach state of the mobile wireless device 102 to the wireless network 100 changes, as well as periodically or in response to queries from the UIM card.

Figure 2:
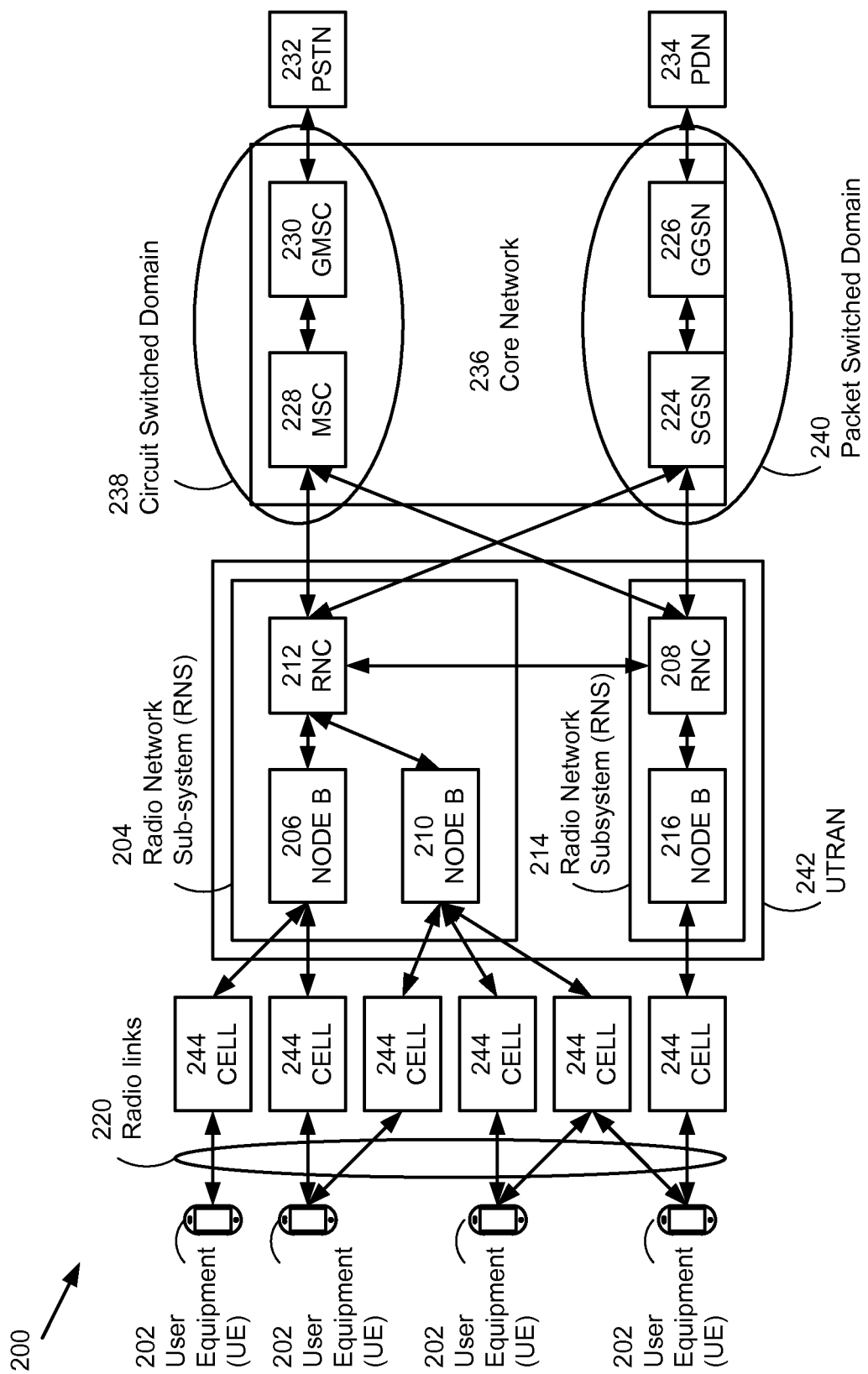
FIG. 2 illustrates components of a UMTS wireless network.

FIG. 2 illustrates a representative UMTS wireless communication network 200 that can include one or more user equipment (UE) 202 that can communicate with a UMTS terrestrial radio access network (UTRAN) 242 that can connect to a core network (CN) 236. (The UE 202 shown in FIG. 2 can be considered a representative type of the mobile wireless device 102 described in FIG. 1.) The core network 236 can include a circuit switched domain 238 that can connect the UE 202 to a public switched telephone network (PSTN) 232 and a packet switched domain 240 that can connect the UE 202 to a packet data network (PDN) 234. The UTRAN 242 can include one or more radio network sub-systems (RNS) 204/214 each of which can include a radio network controller (RNC) 208/212 and one or more Node-Bs (base stations) 206/210/216 managed by a corresponding RNC. The RNC 208/212 within the UTRAN 242 can be interconnected to exchange control information and manage packets received from and destined to the UE 202. Each RNC 208/212 can handle the assignment and management of radio resources for the cells 244 through which the UE 202 connect to the wireless network 200 and can operate as an access point for the UE 202 with respect to the core network 236. The Node-B 206/210/216 can receive information sent by the physical layer of UE 202 through an uplink and transmit data to UE 202 through a downlink and can operate as access points of the UTRAN 242 for UE 202.

UTRAN 242 can construct and maintain a radio access bearer (RAB) for communication between UE 202 and the core network 236. Services provided to a specific UE 202 can include circuit switched (CS) services and packet switched (PS) services, and radio resources can be established separately for the CS and PS services. A general voice conversation can be transported as a circuit switched service, while a Web browsing application can provide access to the World Wide Web (WWW) through an internet connection that can be classified as a packet switched (PS) service. To support circuit switched services, the RNC 208/212 can connect to the mobile switching center (MSC) 228 of core network 236, and MSC 228 can be connected to gateway mobile switching center (GMSC) 230, which can manage connections to other networks, such as the PSTN 232. To support packet switched services, the RNC 208/212 can also be connected to serving general packet radio service (GPRS) support node (SGSN) 224, which can connect to gateway GPRS support node (GGSN) 226 of core network 236. SGSN 224 can support packet communications with the RNC 208/212, and the GGSN 226 can manage connections with other packet switched networks, such as the PDN 234. A representative PDN 234 can be the "Internet".

Figure 3:
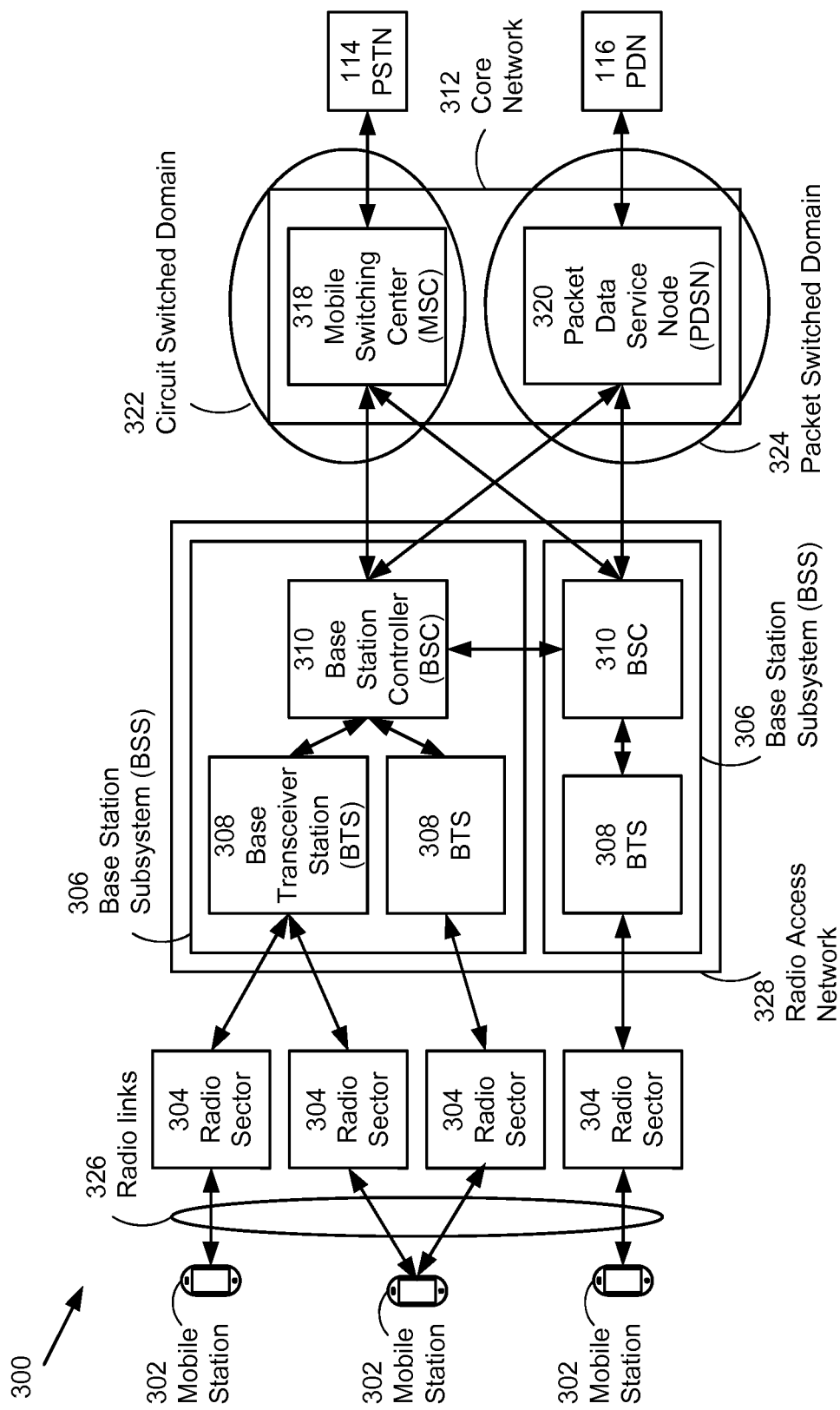
FIG. 3 illustrates components of a CDMA2000 1x wireless network.

FIG. 3 illustrates a representative CDMA2000 1x wireless network 300 that can include elements comparable to those described earlier for the generic wireless network 100 and the UMTS wireless network 200. (A mobile station 302 shown in FIG. 3 can be considered a representative type of the mobile wireless device 102 described in FIG. 1.) Multiple mobile stations 302 can connect to one or more radio sectors 304 through radio frequency links 326. Each radio sector 304 can radiate outward from a base transceiver station (BTS) 308 that can connect to a base station controller (BSC) 310, together forming a base station subsystem (BSS) 306. Multiple base station subsystems 306 can be aggregated to form a radio access network 328. Base station controllers 310 in different base station subsystems 306 can be interconnected. The base station controllers 310 can connect to both a circuit switched domain 322 that use multiple mobile switching centers (MSC) 318 and a packet switched domain 324 formed with packet data service nodes (PDSN) 320, which together can form a core network 312 for the wireless network 300. As with the other wireless networks 100/200 described above, the circuit switched domain 322 of the core network 312 can interconnect to the PSTN 114, while the packet switched domain 324 of the core network 312 can interconnect to the PDN 116.

Figure 4:
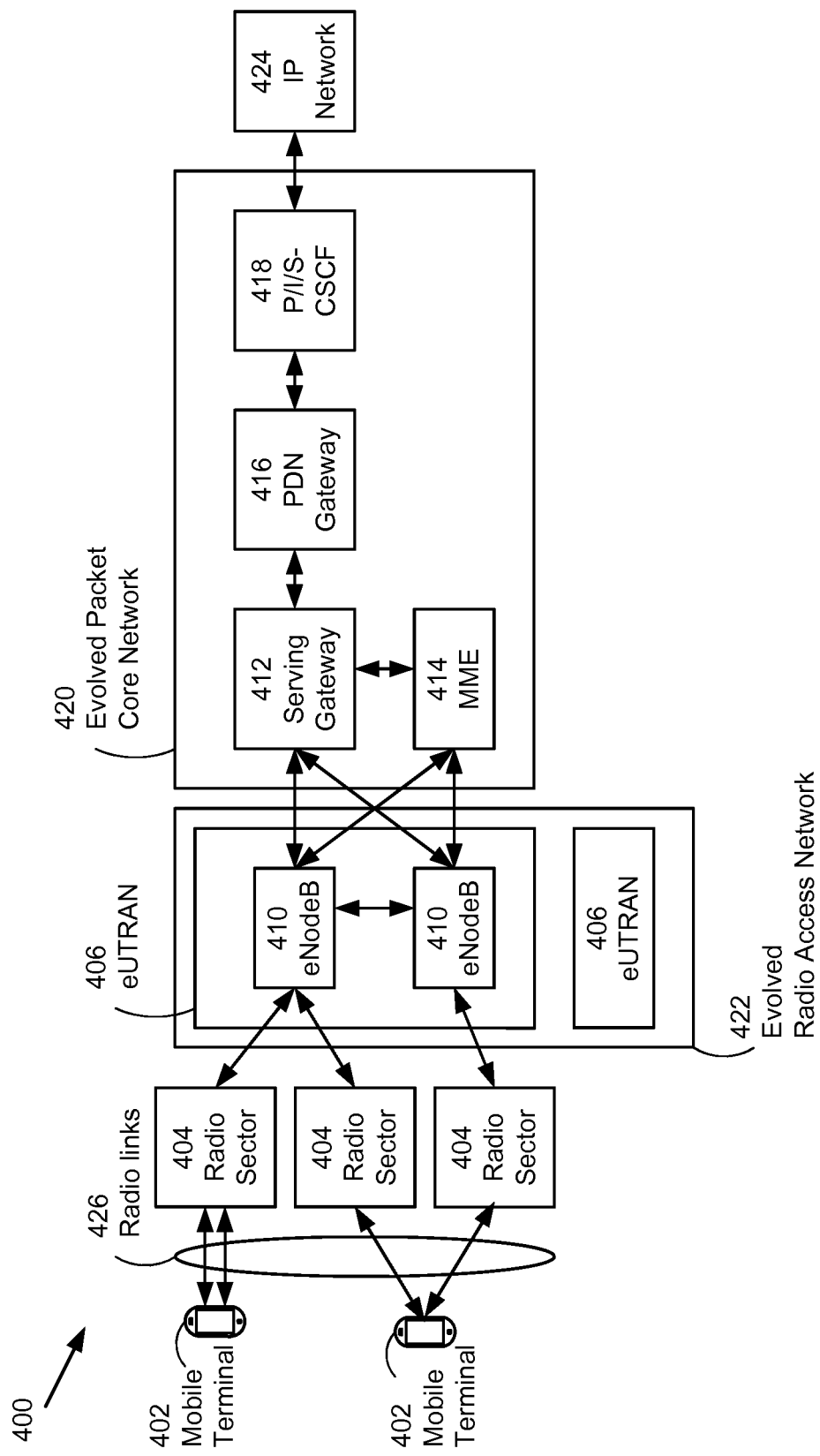
FIG. 4 illustrates components of a LTE wireless network.

FIG. 4 illustrates a representative Long Term Evolution (LTE) wireless network 400 architecture designed as a packet switched network exclusively. A mobile terminal 402 can connect to an evolved radio access network 422 through radio links 426 associated with radio sectors 404 that emanate from evolved Node B's (eNodeB) 410. The eNodeB 410 includes the functions of both the transmitting and receiving base stations (such as the Node B 206 in the UMTS network 200 and the BTS 308 in the CDMA2000 network 300) as well as the base station radio controllers (such as the RNC 212 in the UMTS network 200 and the BSC 310 in the CDMA2000 network 300). The equivalent core network of the LTE wireless network 400 is an evolved packet core network 420 including serving gateways 412 that interconnect the evolved radio access network 422 to public data network (PDN) gateways 416 that connect to external internet protocol (IP) networks 418. Multiple eNodeB 410 can be grouped together to form an evolved UTRAN (eUTRAN) 406. The eNodeB 410 can also be connected to a mobility management entity (MME) 414 that can provide control over connections for the mobile terminal 402.

As a packet switched only network, the LTE wireless network 400 can require either a packet voice service, such as a voice over LTE (VoLTE) service to provide voice connections through the LTE wireless network 400 to the mobile terminal 402, or a circuit switched fall back (CSFB) service. In some areas, as wireless networks evolve during deployment, neither a VoLTE or CSFB service can be supported by either the LTE wireless network 400 or by the mobile terminal 402 (or both). In this case, packet switched services can provide "data" connectivity, while circuit switched services on a parallel wireless network, such as the CDMA2000 1x wireless network 300, can provide voice services. A mobile wireless device can be capable of connecting on both the LTE wireless network 400 and the CDMA2000 1x wireless network 300 to offer the user a full complement of services, although connectivity to both wireless networks simultaneously need not be required. Registration of the mobile terminal 402 with the CDMA2000 1x wireless network 300 can be separate from registration on the LTE wireless network 400. In addition, registration for packet voice services on the LTE wireless network 400 can supplement registration for basic data services on the LTE wireless network 400. The mobile terminal 402 can attach to each of the CDMA2000 1x wireless network 300 and LTE wireless network 400 as well as for voice over LTE services at different times. As a result a generic "in service" message can have ambiguous meaning to an embedded UIM card in the mobile terminal 402.

Figure 5:
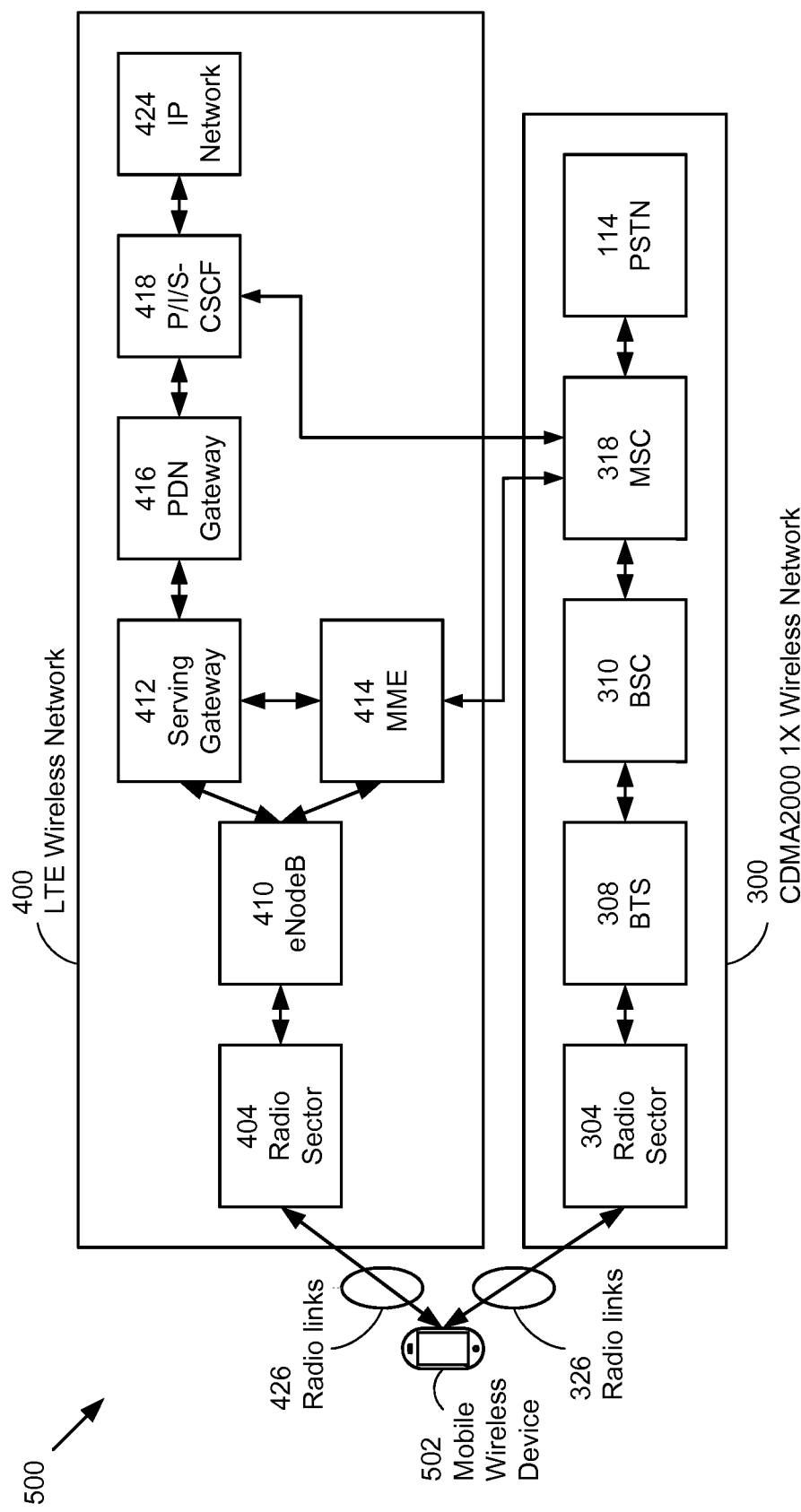
FIG. 5 illustrates a mobile wireless device in communication with the LTE wireless network and CDMA2000 1x wireless network in parallel.

FIG. 5 illustrates a mobile wireless device 502 capable of communicating with the LTE wireless network 400 and also communicating with the CDMA2000 1x wireless network 300 through radio links 426 to the E Node B 410 in the LTE wireless network 400 or through radio links 326 to the BTS 308 in the CDMA2000 1x wireless network 300 respectively. The CDMA2000 1x wireless network 300 can be interconnected with the LTE wireless network 400 through one or more connections between elements of their respective core networks 312/420. In particular the mobility management entity (MME) 414 in the LTE wireless network 400 can provide control functions for mobility of the mobile wireless device 502 between the LTE wireless network 400 and the CDMA2000 1x wireless network 300. The mobile wireless device 502 can be registered with the MME 414 on the LTE wireless network 400. The MME 414 can provide tracking and paging of the mobile wireless device 502 when registered with the LTE wireless network 400. When seeking to establish radio access bearers for the mobile wireless device 502 in the LTE wireless network 400 or to provide handovers within the LTE wireless network 400 between different E Node Bs 410, the MME 414 can also interact with the E Node B 410 and the serving gateway 412.

If the mobile wireless device 902 is camped on or connected to the LTE wireless network 400 and a voice call connection request occurs on the CDMA2000 1x wireless network 300, the mobile switching center (MSC) 300 in the CDMA2000 1x wireless network 300 can provide an indication of the incoming voice connection request to the MME 414. Through a mechanism known as circuit switched fallback (CSFB), the mobile wireless device 502 can transition from the LTE wireless network 400 over to the CDMA2000 1x wireless network 300 to receive the incoming voice connection request on the CDMA2000 1x wireless network 300. CSFB allows the mobile wireless device 502 registered on the LTE wireless network 400 to be "known" to the CDMA2000 1x wireless network 300, i.e. the MME 414 in the LTE wireless network 400 can register the mobile wireless device 502 with the MSC 318 in the CDMA2000 1x wireless network 300.

A primary method intended for voice connections between the mobile wireless device 502 and the LTE wireless network 400 can use a packet voice method known as IMS VoLTE rather than CSFB. The MSC 318 can interact with the call session control function (CSCF) 418 in the LTE wireless network 400 to cause an IP multimedia subsystem (IMS) voice over LTE (VoLTE) connection to start through a session internet protocol (SIP) invite message originating from the P/I/S-CSCF 418 entity, which can be communicated to the mobile wireless device 502 through the E Node B 410. When the mobile wireless device 502 and the LTE wireless network 400 can support an IMS VoLTE service, the mobile wireless device 502 can complete a call to another mobile wireless device on a separate wireless network. The mobile wireless device 502 can support several different types of connections to one or more wireless networks as illustrated in FIG. 5. The mobile wireless device 502 can be CS attached to the CDMA2000 1x wireless network 300 for voice connections through the PSTN 114. The mobile wireless device 502 can also be separately PS attached to the LTE wireless network 400 for data connections through the IP network 424. Additionally, the mobile wireless device 502 can be registered for IMS services that can occur through the LTE wireless network 400 but require separate higher layer connections to function properly. A UIM card in the mobile wireless device 502 can benefit from knowing a more exact state of attachment between the mobile wireless device 502 and the CDMA2000 1x wireless network 300, the LTE wireless network 400 and elements of the LTE wireless network 400 that manage IMS services for the mobile wireless device 502.

Figure 6:
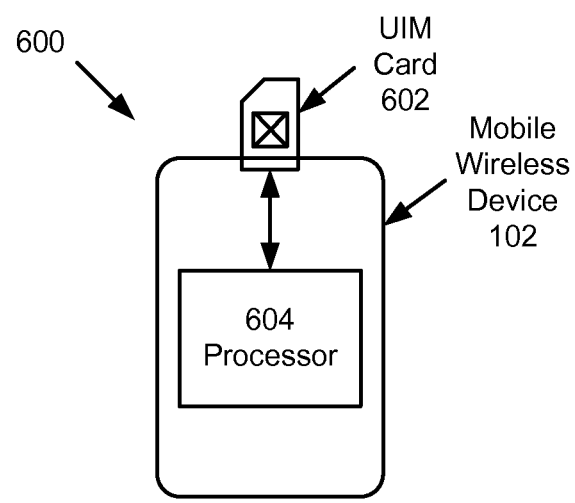
FIG. 6 illustrates a representative set of select components of a mobile wireless device.

FIG. 6 illustrates select elements 600 of the mobile wireless device 102. A UIM card 602 can be included in the mobile wireless device 102 and can contain information and software/firmware for services of the mobile wireless device 102. The UIM card 602 can also be referred to as a subscriber identity module (SIM) card for GSM and GPRS wireless networks, a universal subscriber identity module (USIM) card for the UMTS network 200, a CDMA subscriber identity module (CSIM) application on a removable user identity module (R-UIM) card for the CDMA2000 1x/EV-DO wireless network 300, and a universal integrated circuit card (UICC) for the LTE wireless network 400. Herein the UIM card 602 can refer to any of these "smart cards" that can be used in the mobile wireless device 102. Applications that can support services and functions required to interconnect with different types of wireless networks can be resident on the UIM card 602. Messages (also referred to as commands) can be communicated between the UIM card 602 and a processor 604 in the mobile wireless device 102. The UIM card 602 can send "proactive" commands to the processor 604 in the mobile wireless device 102 thereby triggering a change in behavior of the mobile wireless device 102. The mobile wireless device 102 can also send "envelope" commands to the UIM card 602 informing the UIM card 602 of any changes in status information of the mobile wireless device 102. Representative status information transmitted to the UIM card 602 can include a change in "location" (e.g. a change in a wireless network to which the mobile wireless device 102 is attached), a change in time zone, control commands used for connections to the wireless network, and selections of menu items by a user of the mobile wireless device 102. A representative set of commands used for information exchange between the UIM card 602 and the processor 604 in the mobile wireless device 102 can be a UIM "toolkit" specified by a wireless communication standard published by a wireless standards organization (e.g. 3GPP) and/or by a supplier of the UIM card 602 (e.g. Gemalto) and/or by a wireless network 100 operator (e.g. AT&T) that provides software/firmware in the UIM card 602.

Figure 7:
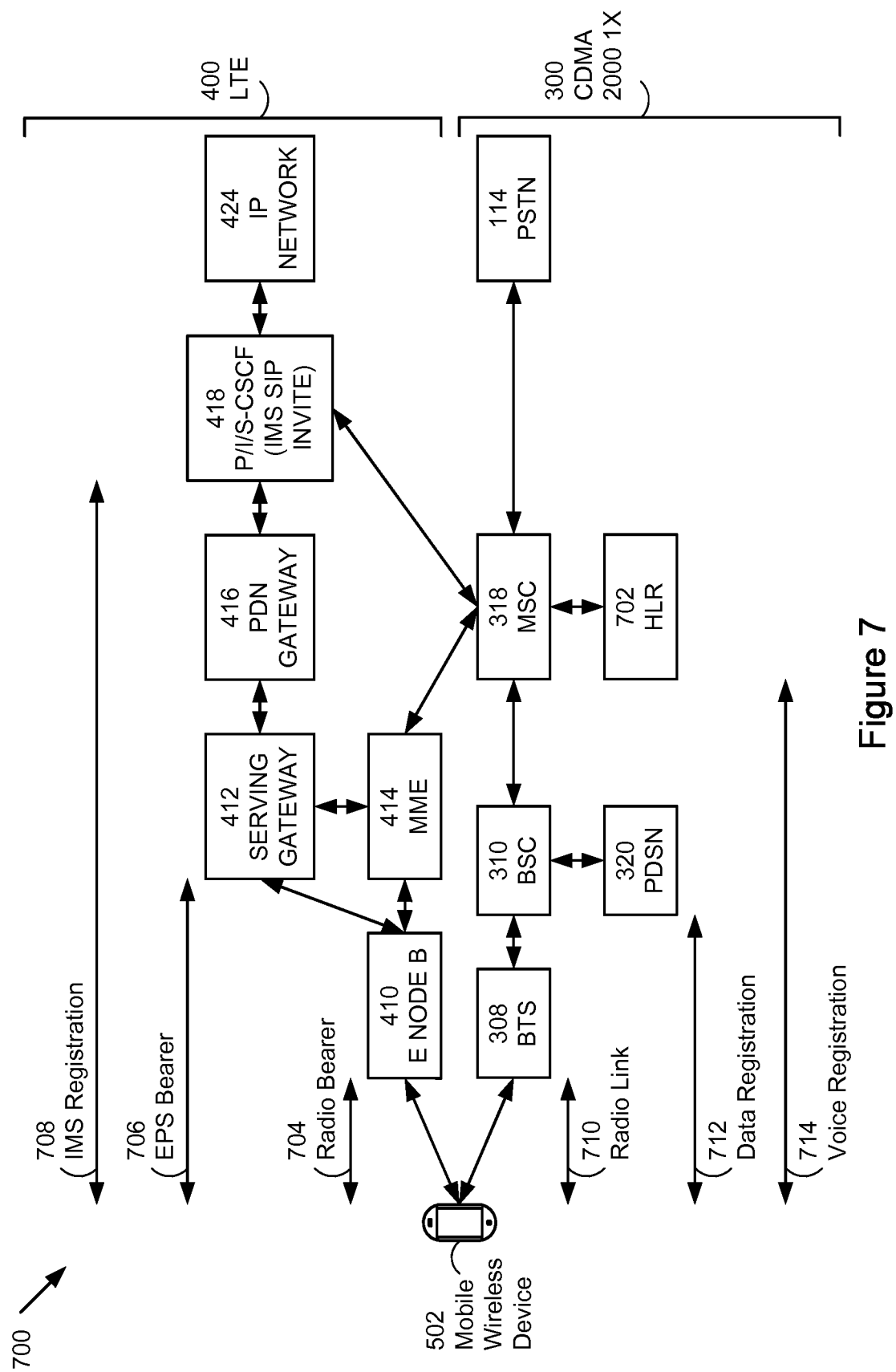
FIG. 7 illustrates several connection types between the mobile wireless communication device and the LTE wireless network and CDMA2000 1x wireless network.

In order for a mobile wireless device 102 to offer services of one or more wireless networks to a user of the mobile wireless device 102, a number of "connections" need be established between the mobile wireless device 102 and the wireless networks. For example, as shown in FIG. 7, several different connections can exist between the mobile wireless device 502 and the LTE wireless network 400 and the CDMA2000 wireless network 300. When in an active state, the mobile wireless device 502 can have one or more radio bearers 704 allocated that can connect the mobile wireless device 502 to the eNodeB 410 of the access portion of the LTE wireless network 400. A default evolved packet system (EPS) bearer 706 can be assigned to the mobile wireless device 502 when connecting to the LTE wireless network 400 and can be used for radio resource control (RRC) signaling. Additional dedicated EPS bearers 706 can be assigned to the mobile wireless device 502 to support data traffic services having particular quality of service (QoS) characteristics required for the particular data traffic service carried on the dedicated EPS bearer 706. Setup of the dedicated EPS bearers 706 can be considered analogous to establishing a packet data protocol (PDP) context in the GSM/GPRS/UMTS network 200. Before the mobile wireless device 502 can receive an IMS service over the LTE wireless network 400, the mobile wireless device 502 can also complete an IMS registration 708 with the call session control function (CSCF) shown in the P/I/S-CSCF 418 block of the LTE wireless network 400. The mobile wireless device 502 can have established a default EPS bearer 706 that can be used for IMS signaling. Following IMS registration (and authentication) services can be provided to the mobile wireless device 902 by the LTE wireless network 400.

Similar to radio bearers 704 on the LTE wireless network 400, one or more radio links 710 on the CDMA2000 1x wireless network 300 can transport signals between the mobile wireless device 502 and the base transceiver system (BTS) 308. To receive voice connection requests, the mobile wireless device 502 can perform a voice registration 714 with the home location register (HLR) 702 that can contain subscriber information in the CDMA2000 1x wireless network 300. For data services in the CDMA2000 1x wireless network 300, a data registration 712 of the mobile wireless device 502 and receipt and delivery of packet data can be handled by the packet data serving node (PDSN) 320.

Each of the registrations illustrated in FIG. 7 (or equivalent registrations for other types of cellular wireless networks) can be communicated individually to the UIM card 602 in the mobile wireless device 102 using the embodiments described herein. The voice registration 714 for voice services can be communicated separately of a data registration 712 for data services to the UIM card 602. Similarly an IMS registration 708 for IMS services (e.g. VoLTE services) can also be separately provided to the UIM card 602. In the absence of receiving specific voice, data and IMS registration (attachment) information, the UIM card 602 can assume an "in service" location status from the mobile wireless device 102 applies to all supported services for the mobile wireless device 102. This erroneous assumption can lead to unexpected behavior of the mobile wireless device 102 as indicated in the description following.

Figure 8:
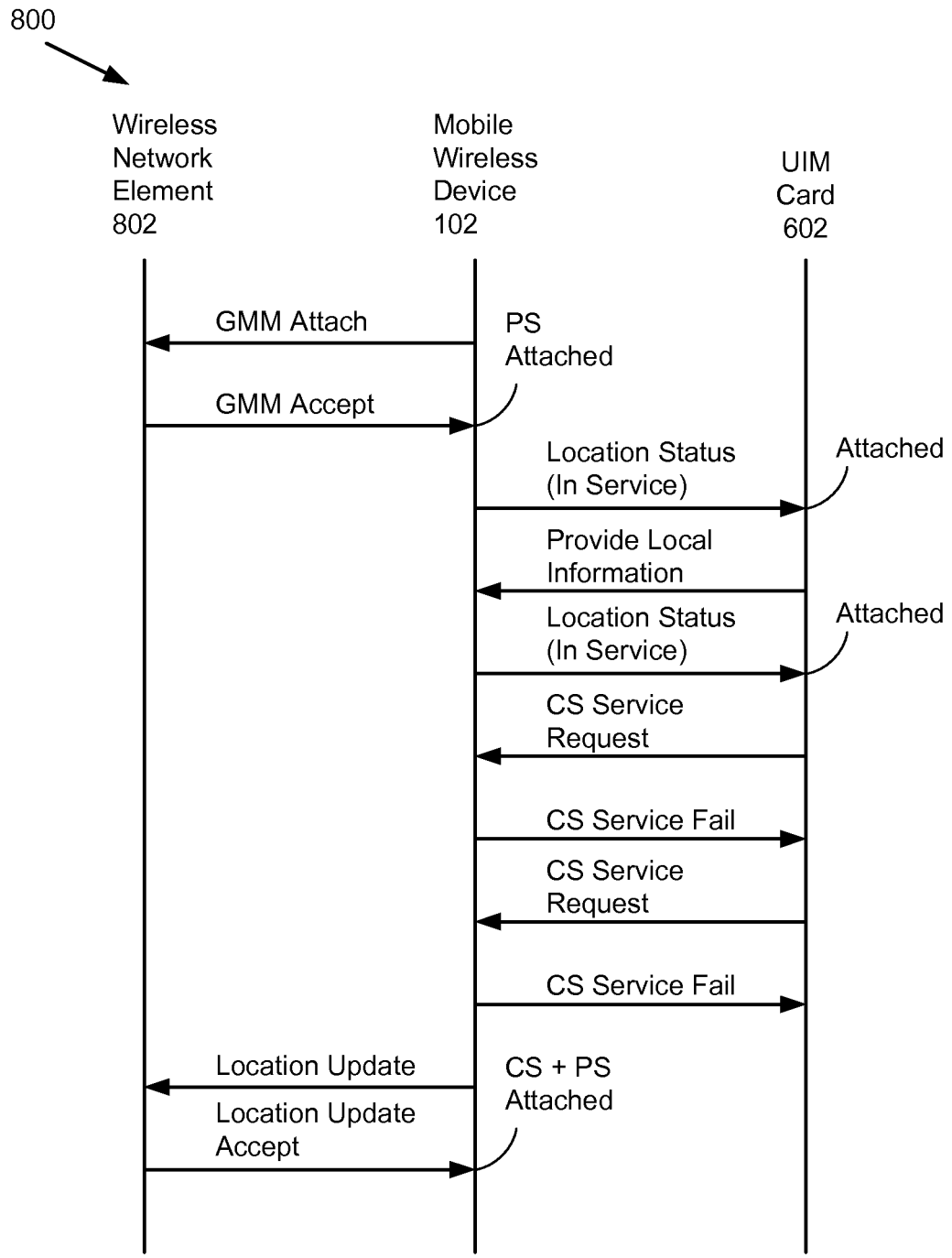
FIGS. 8-11 illustrates several different representative sequences of messages sent between the mobile wireless device and a user identity module (UIM) card as well as one or more elements in a wireless network.

FIG. 8 illustrates a representative message exchange sequence 800 between the mobile wireless device 102 and a wireless network element 802 as well as with the UIM card 602. (Several different entities can be involved in the establishment of connections between the mobile wireless device 102 and the wireless network 100. The single "wireless network element" 802 in FIG. 8 can represent any of these network entities singly or together.) The message exchange sequence 800 can use a location update status command that only provides a generic indication of an "in service" condition of the mobile wireless device 102 with the wireless network 100 (i.e. lacks specificity). As a result, subsequent service requests from the UIM card 602 for the "wrong" type of service can result in service activation failures. In the sequence shown, the mobile wireless device 102 attaches to the wireless network 100 for a packet switched data connection, while the UIM card attempts to initiate a circuit switched voice connection in response to the "in service" indication. The mobile wireless device 102 can attach to the wireless network 100 for a data service by sending an attach command (designated as a GPRS mobility management, GMM, attach command in FIG. 8) to a wireless network element 802. The wireless network element 802 can respond to the GMM attach command by sending a GMM accept command to the mobile wireless device 102, after which the mobile wireless device 102 can be considered packet switched (PS) attached to the wireless network 100. (A number of commands between the mobile wireless device 102 and the wireless network element 802 may also occur to realize the PS attachment but are omitted from FIG. 8 to simplify the illustration.) The mobile wireless device 102 can indicate the PS attached state to the UIM card 602. The mobile wireless device 102 can send a location status message to the UIM card 602 that indicates an "in service" condition. The location status message can be embedded in an "envelope command" type of message. The UIM card 602 can conclude that the mobile wireless device 102 is "attached" to the wireless network 100, although the specific type of attachment can be unknown to the UIM card 602. The UIM card 602 can subsequently query for location status information from the mobile wireless device 102 by sending a "Provide Local Information" proactive command. The mobile wireless device 102 can respond by sending to the UIM card 602 the "in service" status again in a location status message in an envelope command. The UIM card 602 can conclude erroneously that the mobile wireless device is both CS attached and PS attached to the wireless network 100, even though the mobile wireless device 102 is only PS attached to the wireless network 100.

After receiving the "in service" status, the UIM card 602 can initiate a CS connection by sending a "CS Service Request" command to the mobile wireless device 102. As the mobile wireless device 102 is not CS attached to the wireless network, the mobile wireless device 102 can return a "CS Service Fail" message to the UIM card 602. As the UIM card 602 does not know the actual CS attachment state of the mobile wireless device 102, and in response to the previous CS setup failure, the UIM card 602 can resend the CS service request again. Any CS service requests by the UIM card 602 will result in CS service failures until the mobile wireless device 102 is CS attached to the wireless network 100. As indicated in FIG. 8, the mobile wireless device 102 can eventually send a location update to the wireless network element 802 and receive a location update acceptance from the wireless network 100, at which point the mobile wireless device 102 is both CS and PS attached to the wireless network 100. During the time period between the initial PS attachment and the subsequent CS attachment, CS service requests from the UIM card 610 to the mobile wireless device 102 will repeatedly fail. In some instances, this repeated failure can be misinterpreted by the UIM card 602 depending on operator specific firmware resident on the UIM card 602. Repeated CS service failure results can be associated inadvertently with a hardware fault, a software fault, an authorization failure or another type of fault of the mobile wireless device 102.

Figure 9:
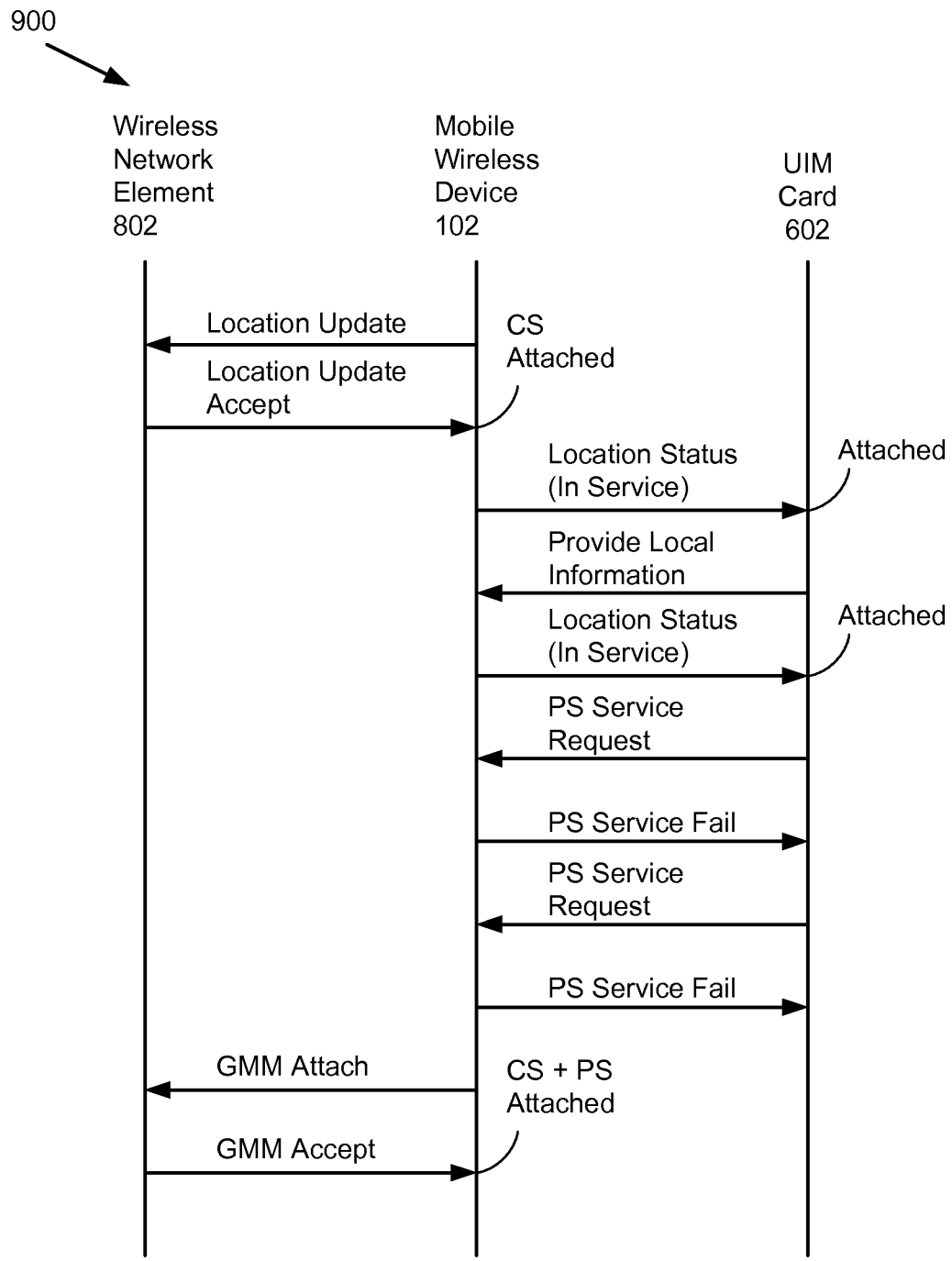

FIG. 9 illustrates another representative message exchange 900 between the mobile wireless device 102 and the UIM card 602 in which the mobile wireless device 102 completes a CS attachment to the wireless network 100 before a PS attachment occurs. As in FIG. 8, the UIM card 602 receives a generic "in service" location status message from the mobile wireless device 102 and erroneously concludes that the mobile wireless device 102 is PS attached to the wireless network 100. The UIM card 602 attempts to send a proactive PS service request command, e.g. an "open channel" command, to establish a PS connection. As the mobile wireless device 102 is not attached to the wireless network 100, the mobile wireless device 102 returns a failure message to the UIM card 602. No radio bearer for the PS connection can be established. Repeated requests from the UIM card 602 to the mobile wireless device 102 to establish a PS connection will fail until the mobile wireless device successfully PS attaches to the wireless network 100.

Figure 10:
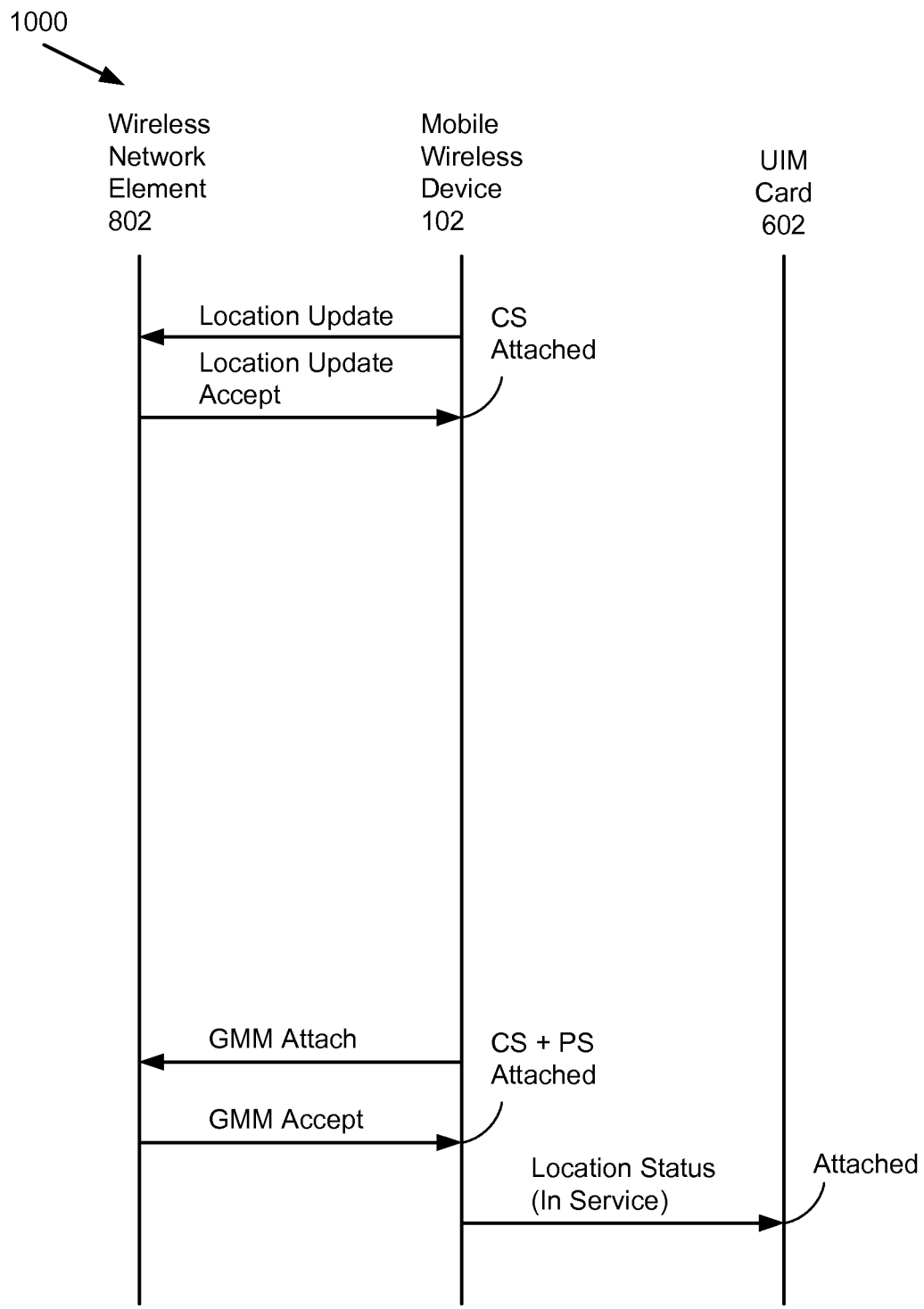

FIG. 10 illustrates a representative attachment sequence 1000 in which the mobile wireless device 102 waits to indicate "in service" to the UIM card 602 until after both a CS attachment and a PS attachment has occurred. In this case, the UIM card can successfully initiate a CS connection or a PS connection after receiving the location status "in service" message; however, CS connections are delayed by not being available to the UIM card 602 until after the PS attachment occurs. In addition, future services can include additional attachment requirements, such as for an Internet multimedia service (IMS) used for voice over LTE (VoLTE). The generic "in service" message provided to the UIM card 602 cannot adequately cover the variety of hardware and/or software configurations that multi-functional mobile wireless devices 102 can offer. As such, new location status commands can provide greater specificity to the UIM card 602 in the mobile wireless device 102. The UIM card can more accurately determine sets of commands and/or services that can used by the mobile wireless device 102 in its current actual state based on specific location status commands rather than on a generic location status command.

Figure 11:
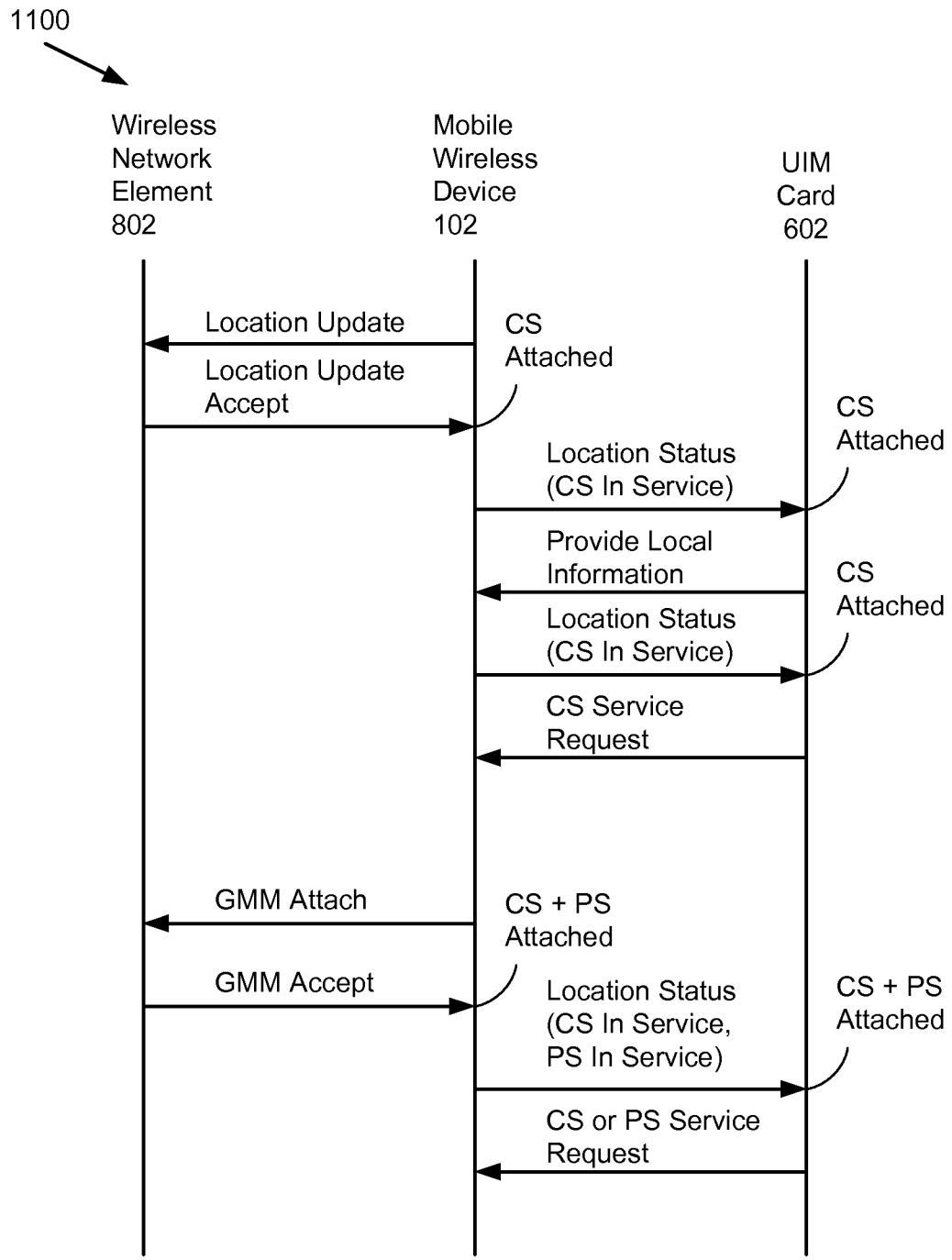

FIG. 11 illustrates a representative message sequence 1100 in which the mobile wireless device sends a location status command that includes a specific indication of a CS attachment to the UIM card 602 after the mobile wireless device 102 is CS attached to the wireless network 100. The UIM card 602 can recognize that the mobile wireless device 102 is CS attached to the wireless network 100 and properly initiate a CS service request. (Subsequent commands to complete and use the CS connection are not shown in the diagram.) Similarly following a PS attachment of the mobile wireless device 102 to the wireless network 100, the UIM card 602 can receive a location status message that indicates that the mobile wireless device 102 is both CS attached (as indicated previously) and PS attached (as subsequently completed). The UIM card 601 can then successfully send a CS service request or a PS service request when the mobile wireless device 102 is both CS and PS attached. The CS and PS service failures illustrated in FIGS. 8 and 9, as well as the delay in initiating at least one type of connection illustrated in FIG. 10, can be avoided by sending more specific location status information to the UIM card 610 as illustrated in FIG. 11.

Figure 12:
FIG. 12 illustrates representative structures for status messages sent between a processor in the mobile wireless device and the UIM card.
Figure 12:

Table 1200 in FIG. 12 illustrates a prior art format for a location status command that can be sent by the mobile wireless device 102 to the UIM card 602. The prior art location status command includes three bytes, a first byte indicating that the message is a location status command, a second byte indicating the number of bytes that follow containing the actual information, and a third byte that contains the location status. As described earlier, this location status is "generic" for any type of attachment of the mobile wireless device 102 to the wireless network 100 and does not provide specific information about the type of attachment that can exist between the mobile wireless device 102 and the wireless network 100. The location status byte can indicate "in service", "limited service" and "not in service" values. "Limited service" can be used to indicate that the mobile wireless device 102 is capable of "emergency" voice calls but no other services. "Not in service" can indicate that no services are available to the mobile wireless device 102, while "in service" can indicate that the mobile wireless device 102 is attached to the wireless network (although in an unspecified manner).

Table 1210 in FIG. 12 illustrates a representative format having a location status command that includes specific attachment information of the mobile wireless device 102 to the wireless network 100. The first byte indicates the location status message type. The second byte indicates that three additional bytes follow that detail the location status of the mobile wireless device 102. The third byte and fourth byte provide location status attachment information for CS services and for PS services of the mobile wireless device 102 to the wireless network 100. In a representative embodiment, the coding for the CS location status byte and in the PS location status bytes can use "in service", "limited service" and "not in service" values. In another embodiment, the CS location status byte can use "in service", "limited service" and "not in service" values, while the PS location status byte can use only "in service" and "not in service" values. The fifth byte of the location status message can include an IMS location status that indicates the attachment state of the mobile wireless device 102 to the wireless network 100 with respect to IMS based services, such as for voice over LTE services. The values for the IMS location status can include "IMS detached" and "IMS attached". The coding for the IMS location status can also include "in progress" values to indicate that the IMS attachment or detachment is currently underway, e.g. "IMS attach in progress" and "IMS detach in progress". The IMS location status byte extends the location status to mobile wireless devices 102 that provide data, voice and SMS over an IMS connection (rather than through a CS or PS connection). When the mobile wireless device 102 completes IMS registration 708 with the P/I/S-CSCF network element 418, then the mobile wireless device can initiate and accept SIP invite messages to form data, voice and SMS connections over IMS.

Figure 13:
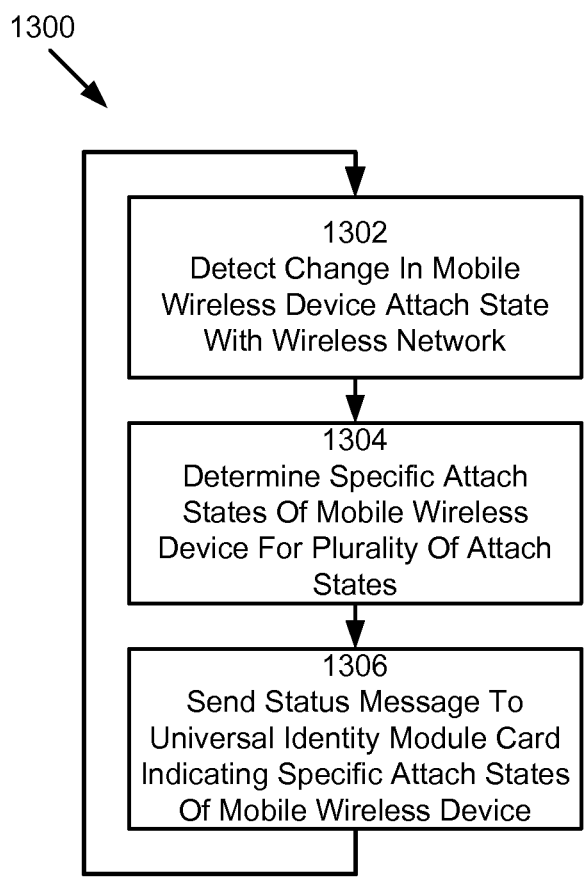
FIG. 13 illustrates a representative method to communicate state information between a mobile wireless device and a user identity module card is described.

FIG. 13 illustrates a representative method 1300 that the processor 604 in the mobile wireless device 102 performs to communicate state information to the UIM card 602 embedded in the mobile wireless device 102. The processor 602 detects a change in an attach state of the mobile wireless device 102 to the wireless network 100 in step 1302. The change in attach state of the mobile wireless device 102 is from a detached state to an attached state, a change of the attached state (e.g. supporting CS and PS versus CS only or PS only) or a change to a detached state. In step 1304, the processor 604 determines the specific attach states of the mobile wireless device 102 to the wireless network 100 for multiple possible attach states. In representative embodiments, the attach states refers to CS attachments, PS attachments and/or IMS attachments of the mobile wireless device 102 to the wireless network 100. In some embodiments, attached states are to two or more different wireless networks. In step 1306 the processor 604 sends a status message to the UIM card 602 embedded in the mobile wireless device 102 to indicate the specific attach states of the mobile wireless device 102 to the wireless network 100 (or to multiple wireless networks). The status message includes information about attach states for at least two different types of attachments. The steps shown in FIG. 13 can repeat as the mobile wireless device 102 continues to monitor for changes in its attach state with one or more wireless networks. Whenever an attach state change is detected, a status message updating the detailed attach state can be sent the by the mobile wireless device 102 to the UIM card 602.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method of communicating state information between a mobile wireless device and a user identity module card, the method comprising:
   detecting a change in an attach state of the mobile wireless device to a wireless network for at least one of a plurality of attachment types;
   determining the attach state of the mobile wireless device to the wireless network for each of the plurality of attachment types;
   waiting to send a status message to the user identity module card in the mobile wireless device at least until the determined attach state of the mobile wireless device indicates "in service" for at least two of the plurality of attachment types; and
   sending the status message to the user identity module card in the mobile wireless device indicating the determined attach state of the mobile wireless device to the wireless network for each of the plurality of attachment types,
   wherein the at least two of the plurality of attachment types includes at least a circuit switched (CS) attachment type and a packet switched (PS) attachment type, and
   wherein a format of the status message comprises a first byte specifying a location status tag, a second byte specifying a number of location status attachments, and at least two additional bytes, each of which specifies an attach state of a corresponding one of the plurality of attachment types.

2. The method as recited in claim 1, wherein the plurality of attachment types includes an IP multimedia service (IMS) attachment type.

3. The method as recited in claim 2, wherein possible states for each of the CS, PS and IMS attachment types at least include an "in service" state and a "not in service" state.

4. The method as recited in claim 3, wherein the possible states for the IMS attachment type further include an "IMS attach in progress" state and an "IMS detach in progress" state.

5. The method as recited in claim 2, wherein the format of the status message further comprises the attach state for each of the plurality of attachment types.

6. The method as recited in claim 2, wherein the at least two of the plurality of attachment types further includes the IMS attachment type.

7. A mobile wireless device comprising:
   a user identity module card; and
   a processor configured to:
      detect a change in an attach state of the mobile wireless device to a wireless network for at least one of a plurality of attachment types;
      determine the attach state of the mobile wireless device to the wireless network for each of the plurality of attachment types;
      wait at least until completion of circuit switched (CS) and packet switched (PS) attachments of the mobile wireless device to the wireless network; and
      send, subsequent to completion of the CS and PS attachments, a status message to the user identity module card in the mobile wireless device indicating that the mobile wireless device is "in service",
   wherein the plurality of attachment types includes at least a circuit switched (CS) attachment type and a packet switched (PS) attachment type, and
   wherein a format of the status message comprises a first byte specifying a location status tag, a second byte specifying a number of location status attachments, and at least two additional bytes, each of which specifies an attach state of a corresponding one of the plurality of attachment types.

8. The mobile wireless device as recited in claim 7, wherein the plurality of attachment types further includes an IP multimedia service (IMS) attachment type.

9. The mobile wireless device as recited in claim 8, wherein the processor is further configured to:
   wait to send the status message to the user identity module card in the mobile wireless device at least until the determined attach state of the mobile wireless device indicates "in service" for the IMS attachment type.

10. The mobile wireless device as recited in claim 8, wherein the format of the status message comprises the attach state for each of the plurality of attachment types.

11. The mobile wireless device as recited in claim 8, wherein possible states for each of the CS, PS and IMS attachment types at least include an "in service" state and a "not in service" state, and wherein the determined attach state of both the CS attachment type and the PS attachment type indicates "in service" before the processor sends the status message to the user identity module card.

12. The mobile wireless device as recited in claim 11, wherein the possible states for the IMS attachment type further includes an "IMS attach in progress" state and an "IMS detach in progress" state.

13. The mobile wireless device as recited in claim 7, wherein the status message indicates the determined attach state of the mobile wireless device to the wireless network for each of the plurality of attachment types.

14. A non-transitory computer readable medium for a computer system, the non-transitory computer readable medium for communicating state information between a mobile wireless device and a user identity module card and having stored thereon computer program code executable by a processor, the computer program code comprising:
  computer program code that causes the processor to detect a change in an attach state of the mobile wireless device to a wireless network for at least one of a plurality of attachment types;
  computer program code that causes the processor to determine the attach state of the mobile wireless device to the wireless network for each of the plurality of attachment types;
  computer program code that causes the processor to wait to send a status message to the user identity module card in the mobile wireless device at least until the determined attach state of the mobile wireless device indicates "in service" for at least two of the plurality of attachment types; and
  computer program code that causes the processor to send the status message to the user identity module card in the mobile wireless device indicating the determined attach state of the mobile wireless device to the wireless network for each of the plurality of attachment types,
  wherein the at least two of the plurality of attachment types includes at least a circuit switched (CS) attachment type and a packet switched (PS) attachment type, and
  wherein a format of the status message comprises a first byte specifying a location status tag, a second byte specifying a number of location status attachments, and at least two additional bytes, each of which specifies an attach state of a corresponding one of the plurality of attachment types.

15. The non-transitory computer readable medium as recited in claim 14, wherein the plurality of attachment types includes an IP multimedia service (IMS) attachment type.

16. The non-transitory computer readable medium as recited in claim 15, wherein the at least two of the plurality of attachment types further includes the IMS attachment type.

17. The non-transitory computer readable medium as recited in claim 15, wherein the format of the status message comprises the attach state for each of the plurality of attachment types.

18. The non-transitory computer readable medium as recited in claim 15, wherein possible states for each of the CS, PS and IMS attachment types at least include an "in service" state and a "not in service" state.

19. The non-transitory computer readable medium as recited in claim 18, wherein the possible states for the IMS attachment type further include an "IMS attach in progress" state and an "IMS detach in progress" state.

* * * * *